July 31, 1956  W. R. ISOM  2,756,629
INTERMITTENT FILM ADVANCING MECHANISM
Filed May 20, 1953  2 Sheets-Sheet 1
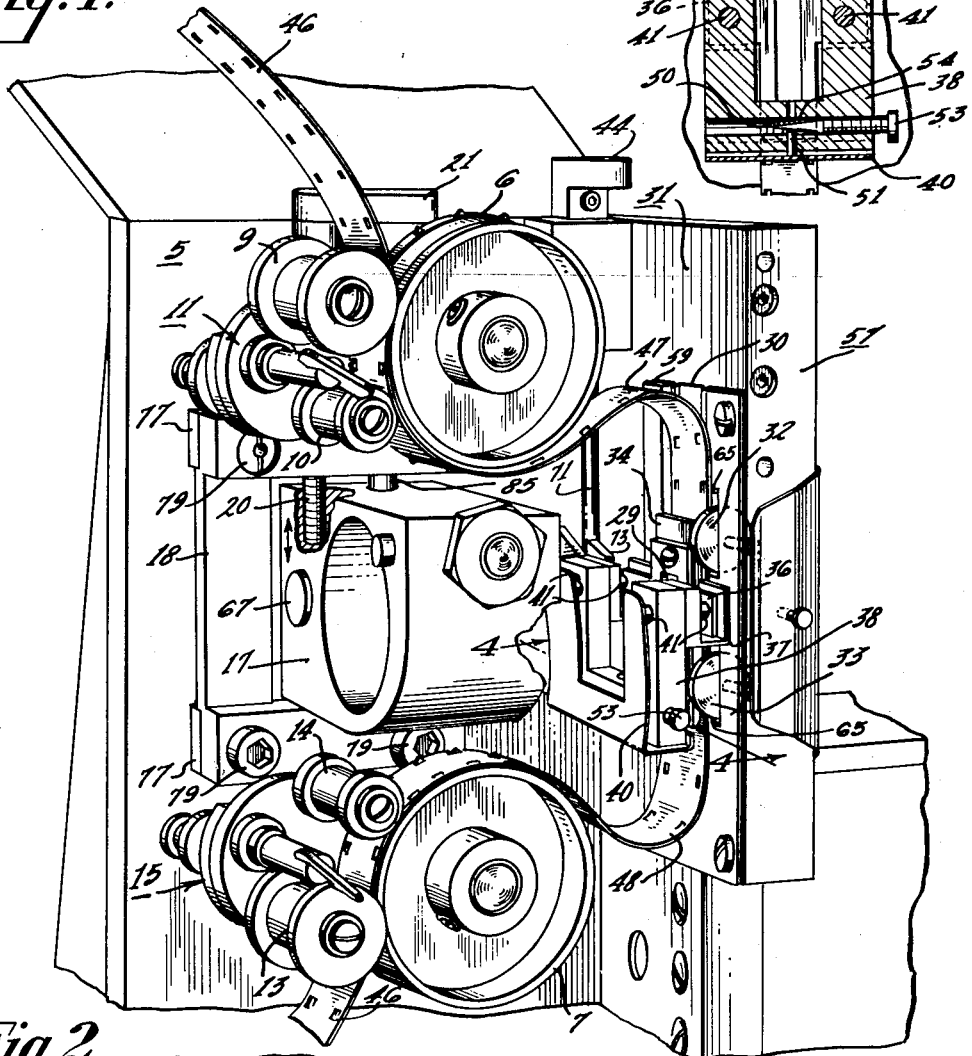
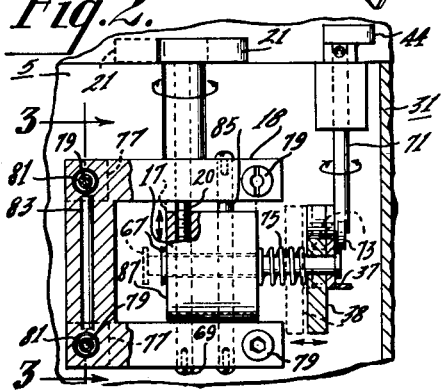
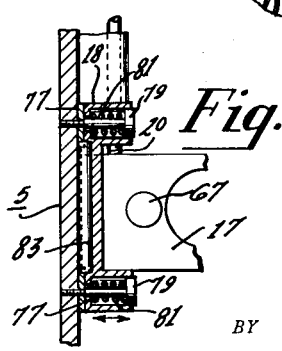
INVENTOR.
Warren R. Isom
BY Morris L. Rabkin
ATTORNEY July 31, 1956 W. R. ISOM 2,756,629
INTERMITTENT FILM ADVANCING MECHANISM
Filed May 20, 1953 2 Sheets-Sheet 2
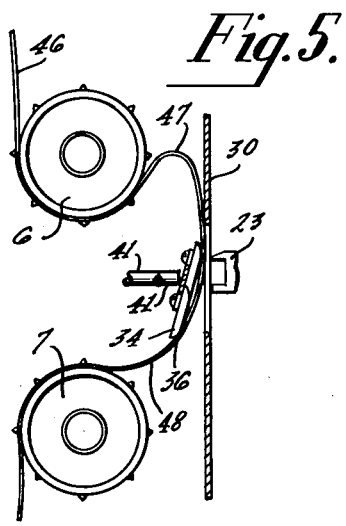
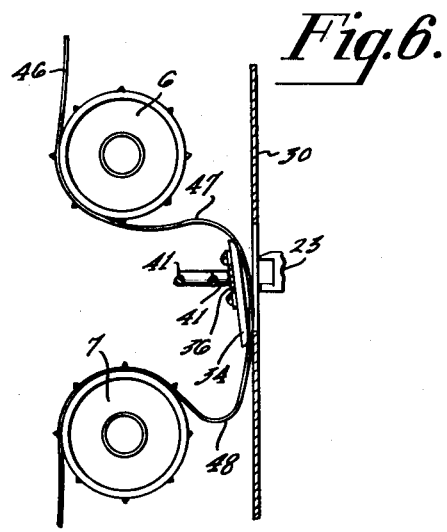
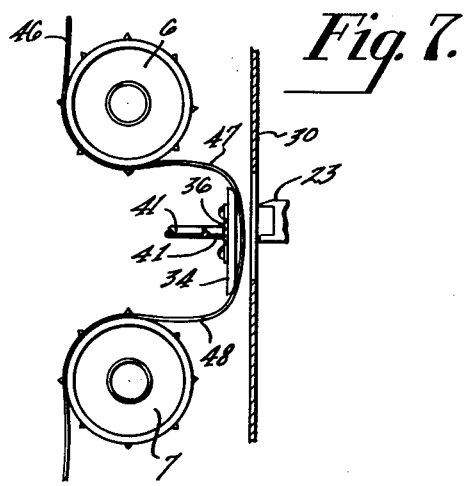
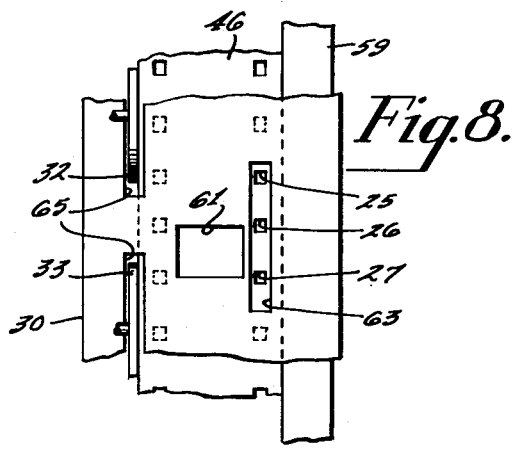
INVENTOR.
*Warren R. Isom*
BY *Morris A. Rabin*
ATTORNEY

United States Patent Office 2,756,629
Patented July 31, 1956

2,756,629
INTERMITTENT FILM ADVANCING MECHANISM

Warren R. Isom, West Collingswood, N. J., assignor to Radio Corporation of America, a corporation of Delaware Application May 20, 1953, Serial No. 356,151

9 Claims. (Cl. 88—18.4)

This invention relates to motion picture film projectors, and particularly to the pull-down and gate mechanism thereof.

Sprockets for uniformly advancing film to an intermittent advancing mechanism and for uniformly advancing the film away from the intermittent mechanism are used in one of the standard types of systems. In such systems, loose loops are formed on either side of the intermittent mechanism to provide the necessary translation between continuous film advancement and intermittent film advancement. In instances where the film is mutilated, particularly at the sprocket holes or perforations, the loose loops can become lost, and the film thus becomes taut between the sprockets and the gate. When this occurs, mutilation of the film generally occurs by the intermittent film advancing mechanism, particularly when it is of the cam-claw type.

The present invention is directed to a cam-claw type of intermittent and gate construction which permits the film to be so positioned that when a loose loop is lost, no mutilation of the film occurs, and by proper phasing of the sprockets and claw motion, a loop may be restored without additional supplemental devices sometimes used for restoring lost loops. The invention also has several simple and rugged adjusting features for controlling the spring tensioning, the gate shoe, the framing of the film in the aperture at the gate, and for properly positioning the beam of light on the film in the gate.

The principal object of the invention, therefore, is to facilitate the projection of motion picture film.

Another object of the invention is to provide an improved intermittent film advancing mechanism and gate unit.

A further object of the invention is to provide a gate and film advancing unit which will restore a lost loose loop and prevent film mutilation when loose loops are lost.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a perspective view of a motion picture film projector embodying the invention.

Fig. 2 is a detail view of the framing adjustment embodied in the invention.

Fig. 3 is a cross-sectional view taken along the line 3—3 of Fig. 2.

Fig. 4 is a detail, cross-sectional view taken along the line 4—4 of Fig. 1.

Fig. 5 is a diagrammatic view showing the positioning of the gate elements when one loose loop is lost.

Fig. 6 is a diagrammatic view showing the positioning of the gate elements when another loose loop is lost.

Fig. 7 is a diagrammatic view showing the positioning of the gate elements when both loose loops are lost, and Fig. 8 is a detail view showing the film perforations with respect to the projection aperture.

Referring now to the drawings, in which the same numerals identify like elements, a projector panel 5 has mounted thereon a feed sprocket 6 and a take-off sprocket 7. The pad rollers 9 and 10 for sprocket 6 are on their adjustable mount 11, which is attached to the panel 5. The pad rollers 13 and 14 for sprocket 7 are on their adjustable mount 15, which is also attached to panel 5. An optical barrel mount 17 is positioned on a U bracket 18, the mount 17 being preferably of the type disclosed and claimed in my co-pending U. S. application, Ser. No. 290,443, filed May 28, 1952, now Patent No. 2,668,476 of February 9, 1954. By means of a screw 20 threaded into the mount 17, the mount may be raised or lowered when the screw 20 is rotated by the lever 21 to accurately position the optical axis of the projecting lens unit and the aperture 29 with respect to the center of the film frames. The screw 20 is limited in travel by the axle of lever 21 at one end and by screw 69 at the other end of the extension of its root diameter through U block 18. The shaft 85 is closely, but slideably, fitted so that the accuracy of alignment is maintained when mount 17 is adjusted.

The projector uses the standard type of cam-claw intermittent mechanism well-known in the art, the claw being shown at 23 in Figs. 5, 6, and 7. The claw has two teeth which are positioned in perforations 25 and 26 and then moved down so as to occupy the positions 26 and 27, as shown in Fig. 8. The film frames are thus intermittently advanced into the projection aperture 29, which is formed in the film pressure shoe 34 and are supported by back plate 30.

The fixed gate unit comprises mounting plates 31 and 57, to which the back plate 30 is attached. The back plate 30 has film edge guides 32 and 33, by which the film is held in lateral contact with the fixed edge guide 59. The back plate 30, as seen in Fig. 8, has an opening 61 in it to permit the passage of light for illuminating the film. Also, openings 63 and 65 accommodate the operation of the claw 23 and the side pressure guides 32 and 33. Mating the back plate 30 is a movable pressure shoe 34 mounted on a cross member 36. The cross member 36 is loosely positioned between the sides of a U bracket 37 attached to a U block 38. A U-shaped spring 40 is bent around the lower edge of the block 38, the ends of the U bearing against pins 41 slidable through the upper ends of the U block 38, the ends of the pins bearing on the cross member 36. The spring provides the desired pressure on the shoe 34 to hold the film at the aperture when the teeth of the claw 23 are removed from the perforations. The shoe and block assembly may be opened for threading the film by lever 44, which is attached to a shaft 71 and lever 73 which slides the assembly away from the back plate 30 against spring 75 guided and supported by shaft 67 protruding through lens mount 17. (See Fig. 2.)

Figs. 2 and 3 illustrate the manner in which the lens mount 17 and the movable gate assembly are mounted to the projector panel 5. The U block 18 is held against the panel 5 by pressure provided by springs 81 recessed in U block 18 under screws 79 at each corner. At two of the corners, U block 18 is undercut so that plates 77 are partially recessed and so that U block 18 is securely positioned vertically when the plates 77 are adjusted snugly against the undercut section. Plates 77 are locked in place by the shoulder of screws 79. Plates 77 have a slot cut in one edge to receive shaft 83. The U block 88 has a groove from one undercut section to the other and which is equal in width to the diameter of shaft 83 which is equal in depth to two-thirds the diameter of shaft 83. Shaft 83 thereby aligns U block 18 horizontally without dependence upon the screws 79, which must be fitted loosely through U block 18 to allow flexibility.

The mount 17 is relieved so that contact is made with the projector panel 5 only along the raised portion 87. The slidable shaft 67 extends through the mount 17 and is secured to U block 38. The U block 38 slides against the projector panel 5 and is held under pressure against the panel by the force of the springs 81 being applied through shaft 85. Thus, the force of the springs 81 is directed against raised portion 87 and U block 38 by shaft 85. This permits the mount 17 to be precisely positioned, yet permits it to be moved for framing adjustments without introducing only loose motion resulting in vibration. It also compensates for wear.

As shown in the figures, a film 46 is shown passing around the sprocket 6 and forming the loose loop 47 between the sprocket 6 and the gate assembly and a loose loop 48 between the gate assembly and the sprocket 7. Thus, Fig. 1 shows the normal operating condition of the film 46, the sprockets 6 and 7 being driven at a constant speed. Since the application of pressure against the gate shoe 34 is substantially at its mid point produced by the spring 40 and pins 41, the shoe may pivot on the pins 41 or be bodily translated against the tension of the spring 40. Thus, if the lower loop 48 is lost, as shown in Fig. 5, the shoe 34 will have its lower end removed from the aperture plate, while its upper end remains adjacent the plate. This permits the film to be engaged only by the top tooth of the claw. This condition of engagement is brought about by properly phasing the sprocket 7 with the cycle of the pull-down claw.

When the film is engaged by the top tooth of the claw, the great acceleration of the claw releases the force of the tension on the bottom of the gate and allows the film to shoot down through the gate until a condition approximately that shown in Fig. 6 exists. Since the pull-down time of the claw is approximately one millisecond, the film is allowed to overshoot before the gate shoe pressure spring 40 can overcome the inertia of the shoe and restore pressure against the aperture plate. If, in extreme cases, this causes the top of the shoe to pull away from the aperture plate, as shown in Fig. 6, the film will not be advanced because it cannot be engaged by the claw until the proper loop 47 is restored by the sprocket 6. Once the loop is restored, normal operation is continued. By curving the upper and lower ends of the shoe, the film is not damaged when the film becomes taut between the ends of the gate and the sprockets. When the condition shown in Fig. 6 obtains, the teeth of claw 23 cannot reach the film until the proper loop is formed, and thus, the film is not mutilated.

In the event that both loops are lost, as shown in Fig. 7, the entire shoe 34 is pulled away from the aperture plate by the taut film so that the claw teeth cannot reach it, and the film will not be mutilated under this condition. To control the spring pressure on the film shoe 34, the lower end of the block 38 is drilled and threaded as shown at 50 in the outer wall of which is positioned a pin 51. Threaded in the drilled hole 50 is a screw 53 having a tapered end 54. The end of the pin 51 abuts the lower cross portion of the spring 40, and by longitudinal adjustment of the screw 53, the pin 51 is moved toward and away from the spring 40. (See Fig. 4.)

Thus, by properly shaping the gate pressure shoe 34 and its mounting so that tensioning pressure is applied at approximately its mid point so that it is free to pivot, and by properly phasing the sprocket 7 with respect to the claw pull-down cycle, not only is mutilation of the film prevented, but a lost loop may be restored with the normal operating intermittent pull-down elements. If the upper film loop or both loops are lost, mutilation of the film is also prevented.

I claim:

1. An intermittent film pull-down mechanism comprising an aperture plate, an elongated film pressure shoe adapted to hold a film against said plate, a claw adapted to intermittently engage the sprocket holes of and intermittently advance said film between said plate and shoe, a sprocket adapted to advance said film from between said plate and shoe, the teeth of said sprocket being phased with the teeth of said claw so that a sprocket hole is opposite the upper tooth of said claw at the beginning of the pull-down cycle of said claw when said film is taut between said sprocket and said shoe, and a resilient mounting for said shoe for applying pressure to said shoe at substantially the center thereof, said mounting permitting said shoe to pivot on an axis in the plane of and perpendicular to the long dimension of said shoe, said resilient mounting including a U-shaped spring and a pair of pins bearing against the ends of said spring and said shoe.

2. A motion picture film projector comprising a plate, a pair of sprockets mounted on said plate and adapted to continuously advance a film, a cam-claw type intermittent mechanism intermediate said sprockets, said film being adapted to be normally positioned in loose loops between said sprockets and mechanism, and a film gate assembly, said assembly including an aperture plate, a film pressure shoe elongated in the direction of film travel, a mounting for said shoe at substantially the center thereof, and a spring for applying pressure to said mounting, said mounting permitting pivoting of said shoe on said mounting, the teeth of said sprocket being adapted to advance film from said shoe being phased with the teeth of said cam-claw mechanism so that a sprocket hole is opposite the upper tooth of said cam-claw mechanism at the beginning of the pull-down cycle of said cam-claw mechanism when said film is taut between said shoe and said sprocket.

3. A motion picture film projector in accordance with claim 2, in which said projector includes a lens mount, a hand screw for adjusting said mount with respect to said film, and an adjusting hand screw for said intermittent mechanism, said screws being parallel with said sprocket mounting plate.

4. A motion picture film projector in accordance with claim 2, in which said gate assembly includes a U-shaped mounting block, one end of said spring being attached to one end of said block, a pair of pins bearing against the other ends of said spring and against said shoe mounting, and means in said block for adjusting the tension of said spring on said shoe mounting.

5. A motion picture film projector in accordance with claim 4, in which said shoe has rounded ends.

6. An intermittent film pull-down and gate assembly comprising an aperture plate having an aperture therein, a claw adapted to advance a film adjacent said aperture intermittently, a take-off sprocket for said film, a shoe adapted to contact said film, said shoe being elongated in the direction said film is adapted to travel past said aperture, a right angle supporting member for said shoe and attached thereto at substantially the center of said shoe, a mounting block for said member, a spring attached to said block, and means interconnecting said member and said spring for applying pressure on said shoe, the teeth of said take-off sprocket being phased with the teeth of said claw when said film is taut between said take-off sprocket and said shoe.

7. An intermittent film pull-down and gate assembly in accordance with claim 6, in which said block and said spring are U-shaped, and said means are pins passing through openings in the ends of said block and contacting the ends of said spring and said shoe supporting member.

8. An intermittent film pull-down and gate assembly in accordance with claim 6, in which means are provided for permitting said shoe to hold said film so that said claw may engage the film and restore a lost loop when said loop is lost between said shoe and said take-off sprocket.

9. An intermittent film pull-down mechanism comprising an aperture plate, an elongated film pressure shoe adapted to hold a film against said plate, a toothed claw adapted to intermittently engage the sprocket holes of and intermittently advance said film between said plate and shoe, a sprocket adapted to advance said film after passage between said plate and shoe, the teeth of said sprocket being phased with the teeth of said claw so that a sprocket hole is opposite the upper tooth of said claw at the beginning of the pull-down cycle of said claw when said film is taut between said sprocket and said shoe, and a resilient mounting for said shoe for applying pressure to said shoe at substantially the center thereof, said mounting permitting said shoe to pivot on an axis in the plane of and perpendicular to the long dimension of said shoe.

References Cited in the file of this patent

FOREIGN PATENTS 632,363    Great Britain _____ Nov. 28, 1949